United States Patent Office 3,338,784
Patented Aug. 29, 1967

3,338,784
BENZIMIDAZOLE ANTHELMINTIC COMPOSITIONS AND METHODS
Horace D. Brown, Plainfield, N.J., assignor to Merck & Co., Inc., Rahway, N.J., a corporation of New Jersey
No Drawing. Filed Sept. 1, 1964, Ser. No. 393,725
7 Claims. (Cl. 167—53)

This invention relates generally to novel anthelmintics and to new chemical compounds. More particularly, it is concerned with 2-substituted benzazoles wherein the 2-substituent is a pyronyl or thiapyronyl radical, with methods of making such compounds, and with compositions containing them as active anthelmintic agents.

This application is a continuation-in-part of my pending application, Ser. No. 129,527, filed Aug. 7, 1961, now abandoned.

It has now been found according to the present invention that compounds of the formula

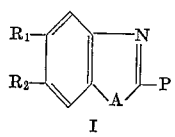

I are effective anthelmintic agents. In Formula I above, A is O, S, or $NR_3$; $R_3$ is a lower alkyl or lower alkenyl radical such as methyl, ethyl, propyl, t-butyl, allyl, methallyl and the like, or $R_3$ may be an acyl radical such as aroyl or lower alkanoyl, examples of which are benzoyl, acetyl, propionyl, formyl and butyroyl; and $R_1$ and $R_2$ are hydrogen, lower alkyl or lower alkoxy. Examples of the two latter classes of substituents are methyl, ethyl, propyl, amyl, isopropoxy, t-butoxy, methoxy and ethoxy radicals. It is preferred that at least one of the substitutents defined as $R_1$ and $R_2$ be hydrogen, and that the alkyl or alkoxy group be one containing less than seven carbon atoms. The nature of the substituent P in the above formula is a critical feature of this invention and P may be an α or γ pyrone or thiapyrone or it may be an α or γ benzpyrone. It will thus be seen that oxopyranyl, oxothiapyranyl, coumarinyl and thiacoumarinyl groups are embraced by the symbol P in the above general formula.

In accordance with the present invention, the novel 2-substituted benzazoles of Formula I above have a high degree of anthelmintic activity, and are of significant value in the prevention and treatment of the parasitic disease known as helminthiasis. This disease is particularly widespread in domesticated animals such as swine, horses, sheep, goats, cattle and dogs, and is effectively treated or prevented by oral administration of the 2-pyronyl and 2-thiapyronyl benzazoles described herein to the susceptible animals.

As an additional aspect of this invention, there are provided new and novel compounds which may be represented by the structural formula

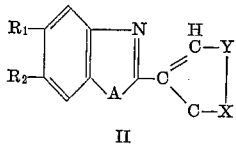

II

In this formula, A, $R_1$ and $R_2$ are as earlier defined; X represents O or S; and Y represents ethylene or phenylene, provided that Y represents only ethylene when X is O.

As in the case of the anthelmintics of Formula I, the nature of the substituent at the 2-position on the benzazole in Formula II is an important feautre of the present invention. It may be an α or γ pyrone or thiapyrone or it may be an α or γ benzthiapyrone. It is to be understood that the benzo derivatives are intended to be included in the generic description herein called thiapyronyl or thiapyrone. As will be appreciated by those skilled in the art, the thiapyrones have the ring oxygen atom replaced by a sulfur atom. These pyrones and thiapyrones are sometimes referred to hereinafter as oxopyrans or oxothiapyrans, a method of nomenclature which is believed to describe the substances of the invention very precisely when referring to specific compounds. It should also be noted at this time that the pyronyl or thiapyronyl radical of Formulae I and II above is attached through one of the carbon atoms of the 6-membered oxygen- or sulfur-containing heterocyclic ring to the carbon atom in the 2-position of the benzazole ring.

In general, the novel compounds of this invention are prepared by processes which comprise the reaction of a carboxylic acid derivative of the pyrone or thiapyrone compound with an ortho-substituted aniline compound, the nature of the particular ortho-substituent depending on whether a benzimidazole, benzoxazole or benzothiazole is to be produced. As applied to the synthesis of a 2-(4′H-4′-oxo-2′-pyranyl)-benzazole, this process may be pictured structurally as:

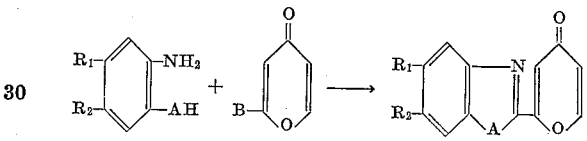

where A represents oxygen, sulfur or >NH, and B represents a carboxylic acid residue or derivative thereof such as a lower alkyl carboxylate, carbonyl halide, amide, aldehyde, nitrile and the like. $R_1$ and $R_2$ are as previously defined.

More particularly, one method of making the 2-pyronyl and 2-thiapyronyl benzothiazoles and benzoxazoles of the invention is by intimately contacting o-aminothiphenol or o-aminophenol with a lower alkyl ester of the pyron or thiapyron carboxylic acid in substantially equimolar amounts and at an elevated temperature. The desired 2-substituted benzothiazole or benzoxazole is produced by fusing the two reactants in the absence of a solvent. It is advantageous, however, to carry out the process in an organic solvent medium and preferably in an aromatic hydrocarbon solvent such as benzene, toluene or xylene at temperatures of from about 70–120° C. When formation of the 2-substituted benzothiazole or benzoxazole is complete, the product may be isolated and purified by known methods such as by removal of the solvent under reduced pressure and crystallization or chromatography of the 2-pyronyl (or thiapyronyl) benzazole. Typical examples of compounds which may be prepared in this manner are 2-(3′-coumarinyl)-benzothiazole, 2-(3′-coumarinyl)-benzoxazole and 2-(4′H-4′-oxo-2′-pyranyl)-5-methoxy-benzothiazole.

An additional method for making the benzoxazoles and benzothiazoles of Formulae I and II above consists in the reaction of o-aminophenol or o-aminothiophenol substituted, if desired, at the 4- and/or 5-positions with an alkyl or alkoxy group, with a carboxylic acid derivative of the six-membered oxgen- or sulfur-containing heterocyclic ring in a reaction medium comprising polyphosphoric acid. This process is particularly satisfactory for synthesizing the 2-substituted benzothiazoles of the invention. It is preferably carried out by intimately contacting equimolar amounts of the two reactants in a medium comprising 5–20 parts by weight of polyphosphoric acid per part of heterocyclic reactant. A pyronyl or thiapyronyl carboxylic acid itself may be used as one of the starting materials or, alternatively, a lower alkyl ester or amide of such acid may be employed. The reaction is carried out at temperatures of from 150–215° C., and preferably at about 180–200° C., for 2–4 hours. The 2-substituted benzothiazoles are then isolated by quenching the cooled reaction mixture with water and neutralizing the polyphoshoric acid with a base such as an alkali or alkali metal hydroxide or carbonate, or ammonium hydroxide. While it can be used if desired, this method is less satisfactory than the one previously described for making the benzoxazole compounds inasmuch as the 2-pyronyl and 2-thiapyronyl benzoxazoles are less stable in the presence of hot mineral acid than are the corresponding benzothiazoles.

A third method suitable for synthesizing the above 2-substituted benzothiazoles and benzoxazoles comprises the reaction of an o-aminophenol or o-aminothiophenol, which may have alkyl or alkoxy groups at the 4- and/or 5-positions, with a pyronyl or thiapyronyl aldehyde in a suitable solvent medium such as a lower alkanol, e.g. methanol, ethanol, isopropanol. The immediate reaction product is a 2-substituted dihydrobenzothiazoline or dihydrobenzoxazoline of the formula

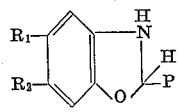

or

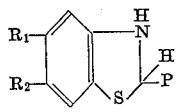

where P, $R_1$ and $R_2$ are as previously defined. This dihydro compound is readily converted to the corresponding benzothiazole or benzoxazole by oxidation with oxidizing agents such as ferric chloride, lead tetra-acetate, cupric acetate, mercuric acetate and the like.

The 2-substituted benzimidazoles of my invention are produced by syntheses of the general type employed for benzothiazoles and benzoxazoles except that o-phenylenediamine or an N-alkyl o-phenylenediamine, rather than o-aminophenol or o-aminothiophenol, is reacted with the pyrone or thiapyrone carboxylic acid or derivative thereof. Thus, 2-substituted benzimidazoles are obtained by reacting together o-phenylenediamine and a pyrone or thiapyrone carboxylic acid (or derivative thereof) in polyphosphoric acid at elevated temperatures, and preferably at temperatures of about 150–300° C., for from 2–6 hours. If the six-membered heterocyclic ring compound tends to decompose at elevated temperature, it is helpful to preheat the reaction mixture to about 100–150° C. for a short period of time, and then to complete the reaction at the higher temperatures referred to above. The desired 2-substituted benzimidazoles are recovered by cooling the reaction mixture and diluting it with water. When the benzimidazoles do not crystallize readily under these conditions, they are precipitated by neutralizing the quenched mixture with a base such as ammonium hydroxide, an alkali metal hydroxide or an alkali metal carbonate.

Alternatively, the 2-substituted benzimidazoles are synthesized by reacting together o-phenylenediamine and an aldehyde derivative of the pyrone or thiapyrone in a reaction medium comprising nitrobenzene. Good results are obtained by heating the reaction mixture slowly to the reflux temperature (ca. 210° C.), and maintaining that temperature for a very short time. If desired, a solvent such as a lower alkanol may be present to promote the solubility of the reactants at lower temperatures. Such solvents are allowed to distil off during the heating period. In many cases the 2-substituted benzimidazoles crystallize directly on cooling the nitrobenzene solution. Alternatively, they may be crystallized by addition of ether or petroleum ether to the nitrobenzene.

The 1-unsubstituted benzimidazoles of Formula I are also prepared by condensation of the heterocyclic aldehyde with o-phenylenediamine or N-alkyl o-phenylenediamine in a suitable solvent such as a lower alkanol. The first product formed is the Schiff base of the aldehyde and the primary amine which is generally converted directly to the benzimidazole. When an o-phenylenediamine or an N-substituted o-phenylenediamine is used, the ring closure of the Schiff base to the 2-substituted benzimidazole is effected with a suitable oxidizing agent such as cupric acetate, lead tetraacetate, mercuric acetate, ferric chloride and the like. When an N-alkyl or N-alkenyl o-phenylenediamine is one of the starting materials, a 1-alkyl or 1-alkenyl-2-substituted benzimidazole is obtained upon ring closure of the intermediate Schiff base to a benzimidazole.

In those cases where the reagent used to bring about benzimidazole formation in the above processes causes formation of an insoluble heavy metal salt of the benzimidazole, such salt is readily converted to the free benzimidazole by removal of the heavy metal with reagents suitable for this purpose, i.e. hydrogen sulfide, ammonium polysulfide, ammonium hydroxide and the like.

The 2-substituted benzimidazoles described herein are normally isolated as the free base. They are readily converted to acid addition salts by treatment with acid. Examples of salts which may be formed in this manner are mineral acid salts such as the hydrohalides, e.g. hydrochloride, hydrobromide, hydroiodide, sulfates, nitrates, phosphates, and the like, aliphatic acid salts such as the acetate, trimethylacetate, t-butylacetate, or propionate, salts of polycarboxylic acids such as the citrate, oxalate, succinate and the like and salts of other insoluble organic acids such as the embonate and hydroxynaphthoate salts. Certain of these salts, such as the hydrohalides, are much more water soluble than the free bases. Since the solubility may also be decreased by formation of an appropriate salt, it will be seen that the solubility properties of a particular compound may be generally adjusted by judicious selection of a salt. When such materials are to be used in salt form as anthelmintics, it is, of course, desirable that the particular acid employed be an edible, non-toxic one.

As previously stated, the N–1 position of the 2-pyronyl and 2-thiapyronyl benzimidazoles described herein may be substituted with hydrogen, a lower alkyl group such as methyl, ethyl, propyl or isopropyl, a lower alkenyl radical such as allyl or methallyl, or an acyl radical. The acyl substituent is an aroyl group, e.g. benzoyl, p-chlorobenzoyl, or an alkanoyl group, examples of which are acetyl, propionyl, formyl, valeroyl and the like. The N–1 alkyl and N–1 alkenyl 2-substituted benzimidazoles are synthesized from the corresponding parent benzimidazole by reacting an alkali metal salt thereof with an alkylating or alkenylating agent, representative examples being dimethyl sulfate, diethyl sulfate, allyl bromide, methallyl bromide and n-propyl bromide. To form the N–1 acylated products, the alkali metal salt of the benzimidazole is intimately contacted with an acylating agent, and preferably with a lower alkanoyl acid halide or aroyl acid halide, such as acetyl chloride, propionyl bromide, benzoyl chloride and the like.

Representative examples of the anthelmintically active compounds of this invention which may be prepared from the indicated reactants by the processes disclosed above are 2-(3′-coumarinyl)-benzimidazole, from o-phenylenediamine and coumarin-3-carboxylic acid ethyl ester; 2-(3′-thiacoumarinyl)-benzothiazole, from o-aminothiophenol and thiacoumarin-3-carboxylic acid methyl ester; 2-(4′H-4′-oxo - 3′ - thiapyranyl) - benzoxazole, from o-aminophenol and 3 - carboethoxy - 4H -4-oxo-thiapyran;

2 - (4'H-4'-oxo-2'-pyranyl) - 5 - methoxy-benzothiazole, from 2-amino - 4 - methoxythiophenol and 2 - carbomethoxy - 4H - 4 - oxo - pyran; 2 - (2'H - 2' - oxo - 5'-pyranyl) - benzimidazole, from o-phenylenediamine and 5-aldehydo - 2H - 2 - oxo - pyran; 2-(4'H-4'-oxo-2'-pyranyl)-benzimidazole, from o - phenylenediamine and 2-aldehydo-4H-4-oxo-pyran; 1-benzoyl - 2 - (3'-coumarinyl)-benzimidazole, from the sodium salt of 2-(3'-coumarinyl)-benzimidazole and benzoyl chloride; 1-methyl-2-(3'-thiacoumarinyl)-benzimidazole, from the potassium salt of 2-(3'-thiacoumarinyl)-benzimidazole and dimethyl sulfate.

The o-substituted aniline compounds and the carboxylic acid derivatives of the pyrones and thiapyrones employed as starting materials in the processes of this invention are known in the literature or are made from known compounds by methods described in the literature for analogous substances and well known to those skilled in this art.

As stated hereinabove, it has now been found that the parasitic disease helminthiasis may be effectively controlled in animals susceptible to it by the administration of a small but effective quantity of a benzazole of Formula I. For use in the treatment or prevention of the disease, compositions are employed wherein such benzazoles are incorporated in or intimately admixed with suitable carriers or diluents. The amount of anthelmintic agent employed for optimum results will, of course, depend upon the particular 2-substituted benzazole used, the species of animal to be treated, the method of treatment to be employed, the severity and type of the infection and whether therapeutic or prophylactic use is intended.

When domesticated animals such as sheep, goats, cattle or horses are to be treated therapeutically for an established anthelmintic infection, it is preferred to administer the compounds orally in boluses or drenches. Such compositions are generally given as a single dose or at frequent intervals over a short period of time. Daily doses of from 15–400 mg. of benzazole per kilogram of animal body weight, and preferably of 30–300 mg./kg. of body weight, are normally employed in either single or divided doses. Administration of the compounds at these levels for just one day is normally an adequate course of therapeutic treatment, but additional treatments may be employed without adverse results. The boluses or drenches used for this type of administration contain the desired concentration of anthelmintic agent intimately dispersed or dissolved in physiologically acceptable diluents or carriers. The active anthelmintic ingredient is blended or mixed with orally ingestible diluents, fillers, binders, lubricants, suspending agents, wetting agents and like excipients by conventional formulating techniques. Suspending agents are particularly valuable when a drench is desired and should be used in such amount as to permit a uniform suspension of the active ingredient in water. The boluses, tablets or drenches are conveniently made to contain from about 5–70% by weight of anthelimintic agent since such compositions may be satisfactorily employed to supply the animal with the required dose of benzazole compound. These compositions are generally compounded directly in unit dosage form, except that drenches may be made up in bulk for subsequent subdivision, or made available as a powder suitable for suspension in an aqueous vehicle. Alternatively, the anthelmintics may be administered parenterally or intramuscularly after dissolving or suspending them in a suitable sterile carrier vehicle such as an isotonic saline vehicle.

When continuous administration of the anthelmintic is intended, such as for prophylactic use, the active ingredient is generally incorporated in the animal feed or drinking water. This is particularly satisfactory when the compounds are to be fed continuously over a period of days. For such purpose it is convenient to prepare initially feed supplements or premixes wherein the anthelmintic is intimately dispersed in an orally ingestible carrier that is inert, i.e. non-reactive, with respect to the anthelmintic. These supplements are then incorporated in or added to the finished animal feed. Examples of diluents suitable for the supplement compositions are solid orally ingestible carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In preparing solid compositions the active ingredient is intimately dispersed or admixed throughout the carrier vehicle by techniques such as grinding, stirring, milling or tumbling. By selecting proper diluents and by altering the ratio of carrier to active ingredient, compositions of any desired concentration may be prepared.

Where the 2-pyronyl or 2-thiapyronyl benzazoles are administered in the animal feed, good results are obtained when the feed contains from about 0.025% to about 0.25% by weight of the anthelmintic. Such medicated feed compositions can be prepared either for direct use by mixing the above amount of active ingredient directly with the feed or, preferably, as feed supplements containing higher concentrations of the active ingredient uniformly dispersed in a solid edible carrier. The supplements are then dispersed or mixed into the feed to produce the desired concentration of active ingredient for feeding. Since it is convenient for the feed manufacturer to use about one pound of feed supplement for each ton of finished feed, the desired concentration of active ingredient in the feed supplement is partly a function of the level of anthelmintic desired in the finished feed. In general, feed supplements containing from about 2.5% to about 50% by weight of active ingredient are employed to supply the desired dosage in the finished feed.

Additional methods of administering the anthelmintic agents of Formula I comprise formulating them in the salt blocks that are commonly made accessible to animals such as cattle and sheep or by suspending or dissolving the active ingredient in the drinking water of the animals. Alternatively, they may be mixed into the protein and vitamin supplements that are used as top dressings for the feeds of the larger domesticated animals.

The following examples are given for the purpose of illustration and not by way of limitation:

EXAMPLE 1

*2-(3'-coumarinyl)-benzimidazole*

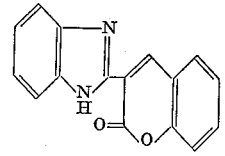

24.5 g. of coumarin-3-carboxylic acid methyl ester, 14.0 g. of o-phenylenediamine and 245 g. of polyphosphoric acid are mixed and heated at about 125° C. for 2 hours with constant stirring. It is then heated for about 3 hours at 175° C. It is then quenched by pouring in a thin stream over 2 liters of a rapidly stirred crushed ice-H$_2$O mixture. The resulting yellow crystals of 2-(3'-coumarinyl)-benzimidazole are filtered, washed with 5% cold sodium bicarbonate and with H$_2$O, and collected by filtration (82 g. wet).

10 g. of these crude crystals are purified by recrystallization from acetone with treatment of the hot acetone solution with decolorizing charcoal, to give substantially pure 2-(3'-coumarinyl)-benzimidazole, M.P. 240–242° C. The M.P. is raised to 243–244° C. by recrystallization from ethyl acetate.

When the above process is carried out using 28.0 g. of the ethyl ester of thiacoumarin-3-carboxylic acid in place of the methyl coumarin-3-carboxylate, there is obtained 2-(3'-thiacoumarinyl)-benzimidazole.

When 2-(3'-coumarinyl)-benzimidazole was fed to two sheep infected with helminths in single oral doses of 50 mg./kg. of body weight, there was obtained a 95% reduction in egg count, the mean pre-treatment egg count being 31,242 and the 10th day post-treatment being 1,400. In addition, worms of the general Haemonchus, Trichostrongylus, Nematodirus and Trichuris were expelled.

EXAMPLE 2

*2-(4'H-4'-oxo-3'-thiapyranyl)-benzimidazole*

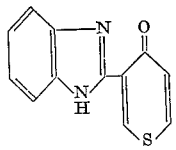

4.0 g. of 3-carbomethoxy-4H-4-oxo-thiapyran, 2.6 g. of o-phenylenediamine and 40 g. of polyphosphoric acid are heated at 145° C., with stirring, for 4 hours. The reaction mixture is cooled slightly and poured into ice-water, and the resulting mixture made slightly pink to phenolphthalein paper with 50% sodium hydroxide solution. The resulting precipitate of 2-(4'H-4'-oxo-3'-thiapyranyl)-benzimidazole is filtered and washed with water. This crude material is dissolved in boiling ethanol, treated with decolorising charcoal, and excess water added to the boiling filtrate. The homogeneous solution is concentrated in vacuo to turbidity, cooled and the resulting precipitate filtered and washed with water to give substantially pure 2-(4'H-4'-oxo-3' - thiapyranyl)-benzimidazole, M.P. 250–254° C. (dec.).

EXAMPLE 3

*2-(4'H-4'-oxo-2'-pyranyl)-benzimidazole*

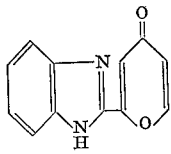

6.8 g. (1.04 mole) of 2-carbethoxy-4H-4-oxo-pyran, 5.0 g. (1.10 mole) of o-phenylenediamine and 70 g. of polyphosphoric acid are combined with stirring at room temperature and the mixture heated slowly to 125° C. in an oil bath. At 125° C. the mixture turns reddish-black. It is heated at 125° C. for 1 hour and then the temperature is raised to 170° C. over a 1-hour period. It is heated at 170° C. for 2 hours and then cooled to room temperature and quenched by pouring in a thin stream onto crushed ice. The quenched mixture is allowed to stand at room temperature for 12 hours. The dark red-brown precipitate is then collected by filtration, washed well with 5% sodium bicarbonate solution, with water and finally air dried. It is dissolved in 300 ml. of ethyl acetate and placed on 280 g. of acid washed alumina. The alumina is eluted successively with petroleum ether, ether, chloroform, acetone and ethanol. The ethanol eluate is concentrated to dryness in vacuo to give 2-(4'H-4'-oxo-2'-pyranyl)-benzimidazole, M.P. 230–240° C. (dec.).

EXAMPLE 4

*2-(4'H-4'-oxo-2'-pyranyl)-benzoxazole*

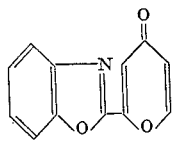

1.2 g. of 4H-4-oxo-pyran-2-aldehyde and 1.1 g. of o-aminophenol are added to 5 ml. of pyridine, and the resulting mixture heated for 40 minutes at 80° C. It is next cooled to room temperature and poured into 20 ml. of 2.5 N hydrochloric acid. A solution of 1.5 g. of ferric chloride in 3 ml. of ethanol is added to the acidic solution and the whole warmed on a steam bath for 50 minutes. It is then concentrated to about 1/10 volume in vacuo and cooled in an ice bath. 2-(4'H-4'-oxo-2'-pyranyl)-benzoxazole crystallizes and is recovered by filtration, washed with ice cold ethanol and air dried.

EXAMPLE 5

*2-(3'-coumarinyl)-benzothiazole*

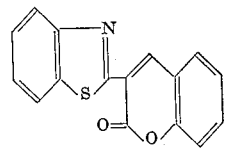

29.5 g. of coumarin-3-carboxylic acid is converted to the acid chloride by treatment with thionyl chloride and the resulting acid chloride added slowly to 19.3 g. of o-aminothiophenol in 110 ml. of toluene. The resulting reaction mass is heated at 85–90° C. for about 2 hours. It is then filtered and the clear filtrate concentrated to dryness. The residue thus obtained is extracted with petroleum ether (B.P. 60–90° C.) for 12 hours in a continuous liquid/liquid extractor. The solvent extract is concentrated to dryness in vacuo and the residue of 2-(3'-coumarinyl)-benzothiazole thus obtained recrystallized from dry ethanol to give substantially pure material.

When an equimolar amount of 4-methyl-2-mercaptoaniline is employed in the above process in place of o-aminothiophenol, 2-(3'-coumarinyl)-6-methyl benzothiazole is obtained.

EXAMPLE 6

*2-(4'H-4'-oxo-3'-thiapyranyl)-benzothiazole*

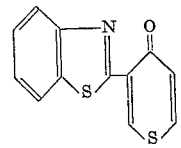

To a solution of 10 g. of o-aminothiophenol in 60 ml. of benzene there is added the acid chloride of 3-carboxy-4H-4-oxo-thiapyran obtained by treating 12 g. of 3-carboxy-4H-4-oxo-thiapyran with thionyl chloride. The resulting reaction mixture is refluxed for 2 hours and then filtered to remove any solid material. The filtrate thus obtained is concentrated to dryness in vacuo and the residue continuously extracted for 15 hours with petroleum ether (B.P. 60–90° C.). The petroleum ether extract is then concentrated to dryness in vacuo to give a residue consisting of 2-(4'H-4'-oxo-3'-thiapyranyl) - benzothiazole. This substance may be purified by recrystallization from ethanol.

EXAMPLE 7

*2-(4'H-4'-oxo-3'-thiapyranyl)-benzimidazole*

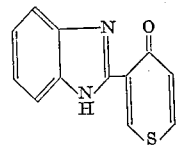

To a suspension of 11 g. of o-phenylenediamine in 50 ml. of nitrobenzene there is added a solution of 14 g. of 4H-4-oxo-thiapyran-2-aldehyde in 20 ml. of methanol. The reaction mixture thus obtained is stirred for a few minutes at room temperature and then heated slowly to 210° C. The methanol is allowed to distil off during this heating period. As soon as the temperature reaches 210° C. the mixture is immediately cooled to about 10° C., during which time the 2-(4'H-4'-oxo-3'-thiapyranyl)-benzimidazole crystallizes. It is recovered by filtration, washed with ether and air dried.

To 1 g. of the above-noted product in 12 ml. of dry dimethylformamide there is added 0.3 g. of a 52% sodium hydride-mineral oil emulsion. The mixture is stirred for about 10 minutes and then warmed slowly to 50° C. and held at this temperature for 10 minutes. It is then cooled and 0.7 g. of ethyl iodide in 2 ml. of dimethylformamide is added slowly. The entire mixture is then heated to 75° C. for 30 minutes, cooled, diluted with 20 ml. of water and finally extracted with 3×10 ml. of ether. The ethyl ether extracts are combined, washed with water and the ether removed by distillation. The residue thus obtained consists of substantially pure 1-ethyl-2-(4'H-4'-oxo-3'-thiapyranyl)-benzimidazole.

When benzoyl chloride is employed in the above example in place of ethyl iodide, there is obtained 1-benzoyl-2-(4'H-4'-oxo-3'-thiapyranyl)-benzimidazole.

EXAMPLE 8

2-(4'H-4'-oxo-2'-pyranyl)-benzothiazole

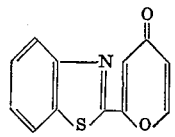

15.6 g. of o-aminothiophenol and 28 g. of the acid chloride of 2-carboxyl-4H-4-oxo-pyran are added to 75 ml. of benzene and the resulting mixture refluxed for 5 hours. The mixture is then filtered and concentrated to dryness in vacuo. The solid is extracted with 5×100 ml. of petroleum ether (B.P. 60–90° C.) and the combined extracts concentrated to dryness in vacuo. The residue consisting of 2-(4'H-4'-oxo-2'-pyranyl)-benzothiazole is purified by recrystallizing from ethanol.

When thiacoumarin-3-carboxylic acid chloride is used in place of the acid chloride of 2-carboxy-4H-4-oxo-pyran in the above example, there is obtained 2-(3'-thiacoumarin)-benzothiazole.

EXAMPLE 9

2-(3'-thiacoumarinyl)-benzimidazole

A solution of 17.5 g. of 2-mercapto benzaldehyde in 600 ml. of methanol is treated with a solution of 10.3 g. of cyanoacetamide and 1.0 g. of piperidine in 100 ml. of water. After a short while an oil precipitates. The solution is filtered and the filtrate is left at room temperature for two days.

The solution is decanted from noncrystalline material and concentrated to a small volume. This is then diluted with water and admixed with benzene. The mixture is filtered and the solid product is washed with benzene and then with ether; M.P. 219–222° C. After recrystallization from acetone, the product, thiacoumarinimide-3-carboxamide, melts at 217–219° C.

A solution of 3.5 g. of thiacoumarinimide-3-carboxamide in 200 ml. of 1 N hydrochloric acid is heated on a steam cone for 2½ hours. On cooling and filtering, the product, thiacoumarin-3-carboxamide, is obtained which upon recrystallization from benzene melts at 245–246° C.

A mixture of 3.5 g. of thiacoumarin-3-carboxamide and 2.1 g. of o-phenylenediamine in 70 g. of polyphosphoric acid is heated with stirring to 175° C. For three hours the temperature is gradually increased to 205° C. The hot solution which results is poured into 800 ml. of ice water with stirring. The precipitate which forms is filtered, washed with water, and treated with 5% sodium carbonate. The crude material is recrystallized from ethanol-water to give 2-(3'-thiacoumarinyl)-benzimidazole; M.P. 251–252° C.

When administered to sheep at a dosage level of 50 mg./kg. of body weight, 2-(3'-thiacoumarinyl)-benzimidazole was highly efficacious in causing expulsion of worms, particularly those of the genus Trichostrongylus.

EXAMPLE 10

Examples of typical drenches containing a compound of Formula I above as active anthelmintic ingredient are:

(A)

| | | |
|---|---|---|
| 2-(4'H-4'-oxo-3'-thiapyranyl)-benzothiazole | gm | 2.3 |
| Antifoam AF emulsion | gm | 0.06 |
| Hydroxyethyl cellulose | gm | 0.3 |
| Sodium phosphate monobasic | gm | 0.3 |
| Benzalkonium chloride (12.8% soln.) | ml | 0.6 |
| Water, to | ml | 30.0 |

(B)

| | | |
|---|---|---|
| 2-(3'-coumarinyl)-benzimidazole | gm | 4.0 |
| Antifoam AF emulsion | gm | 0.06 |
| Hydroxyethyl cellulose | gm | 0.3 |
| Sodium phosphate monobasic | gm | 0.3 |
| Benzalkonium chloride (12.8% soln.) | ml | 0.6 |
| Water, to | ml | 30.0 |

(C)

| | | |
|---|---|---|
| 2-(3'-thiacoumarinyl)-benzimidazole | gm | 4.0 |
| Antifoam AF emulsion | gm | 0.06 |
| Hydroxyethyl cellulose | gm | 0.3 |
| Sodium phosphate monobasic | gm | 0.3 |
| Benzalkonium chloride (12.8% soln.) | ml | 30.0 |
| Water, to | ml | 30.0 |

(D)

Drenches may also be prepared in bulk for subdivision prior to use. The following vehicles are suitable:

(1)

| | | |
|---|---|---|
| Benzalkonium chloride (12.8% soln.) | ml | 40 |
| Antifoam AF emulsion | gm | 4 |
| Hydroxyethyl cellulose | gm | 20 |
| Distilled water, to | ml | 2000 |

(2)

| | | |
|---|---|---|
| Benzalkonium chloride (12.8% soln.) | ml | 0.5 |
| Antifoam AF emulsion | gm | 4 |
| Hydroxyethyl cellulose | gm | 20 |
| Distilled water, to | ml | 2000 |

The compounds of Formula I above are added to the vehicles in concentrations in the range of 3–20 gm./100 ml.

The benzalkonium chloride used in the drench vehicles is a mixture of $C_8$–$C_{18}$ dimethylbenzylammonium chlorides.

EXAMPLE 11

Boluses containing the active anthelmintic agents of this invention are prepared as follows:

(A)

| | Gm. |
|---|---|
| 2-(3'-Thiacoumarinyl)-benzimidazole | 2.0 |
| Dicalcium phosphate | 3.0 |
| Starch | 0.54 |
| Guar gum | 0.15 |
| Talc | 0.14 |
| Magnesium stearate | 0.05 |

(B)

| | |
|---|---|
| 1-Acetyl-2-(4'H-4'-oxo-2'-pyranyl)-benzimidazole | 4.0 |
| Starch | 0.7 |
| Dicalcium phosphate | 1.0 |
| Magnesium stearate | 0.03 |
| Talc | 0.12 |
| Guar gum | 0.2 |

(C)

| | |
|---|---|
| 2-(3'-Coumarinyl)-5-methoxy-benzoxazole | 2.0 |
| Starch | 0.5 |
| Dicalcium phosphate | 3.0 |
| Guar gum | 0.15 |
| Talc | 0.14 |
| Magnesium stearate | 0.05 |

The dicalcium phosphate and the benzazole compound are thoroughly mixed and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried material is then passed through a #16 mesh screen. The guar gum and the balance of the starch are added and the mixture thoroughly blended. Finally, the remainder of the ingredients are added and the entire mass thoroughly mixed and compressed into a bolus.

The diluents and excipients may be varied as known to those skilled in the art.

Any departure from the above description which conforms to the present invention is intended to be included within the scope of the claims.

What is claimed is:

1. An anthelmintic composition that comprises a compound of the formula

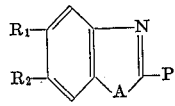

intimately admixed with an orally ingestible carrier, wherein P is selected from the group consisting of 4H-4-oxo-pyranyl and 4H-4-oxo-thiapyranyl, A is selected from the group consisting of O, S and $NR_3$, $R_1$ and $R_2$ are selected from the class consisting of hydrogen, loweralkyl and loweralkoxy, and $R_3$ is selected from the class consisting of hydrogen, loweralkyl, loweralkenyl, aroyl and loweralkanoyl.

2. The composition of claim 1 wherein the carrier is a solid in unit dosage form.

3. The composition of claim 1 wherein the carrier is a liquid drench.

4. The method of treating helminthiasis that comprises orally administering to a host animal susceptible to helminth infections an anthelmintically effective amount of a compound having the formula

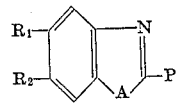

wherein P is selected from the group consisting of 4H-4-oxo-pyranyl and 4H-4-oxo-thiapyranyl, A is selected from the group consisting of O, S and $NR_3$, $R_1$ and $R_2$ are selected from the class consisting of hydrogen, loweralkyl and loweralkoxy, and $R_3$ is selected from the class consisting of hydrogen, loweralkyl, loweralkenyl, aroyl and loweralkanoyl.

5. An anthelmintic composition that comprises a bolus containing an anthelmintically effective amount of a member of the group consisting of 2-(3'-coumarinyl) benzimidazole and 2-(3'-thiacoumarinyl) benzimidazole.

6. An anthelmintic composition that comprises an animal feed having uniformly dispersed therein an anthelmintically effective amount of a member of the group consisting of 2-(3'-coumarinyl) benzimidazole and 2-(3'-thiacoumarinyl) benzimidazole.

7. The method of treating helminthiasis that comprises orally administering to a host animal susceptible to helminth infections and anthelmintically effective amount of 2-(3'-coumarinyl) benzimidazole.

References Cited

UNITED STATES PATENTS

| | | | |
|---|---|---|---|
| 3,014,041 | 12/1961 | Hausermann et al. | 260—304 |
| 3,095,421 | 6/1963 | Liechti et al. | 260—304 |
| 3,152,042 | 10/1964 | Wood et al. | 167—53 |
| 3,155,571 | 11/1964 | Sarett et al. | 167—53 |

ALBERT T. MEYERS, *Primary Examiner.*

N. S. RIZZO, A. D. ROLLINS, S. SINGER,
*Assistant Examiners.*